United States Patent [19]
Osborne et al.

[11] Patent Number: 5,811,171
[45] Date of Patent: Sep. 22, 1998

[54] CERAMIC PRODUCTS

[75] Inventors: Martin Osborne, Brigstock; Richard Allan Brown, St. Albans; Ronald Jones, Corby, all of England

[73] Assignee: S.D. Investments Limited, West Yorkshire, Great Britain

[21] Appl. No.: 331,622

[22] PCT Filed: Apr. 19, 1993

[86] PCT No.: PCT/GB93/00810

§ 371 Date: Jan. 27, 1995

§ 102(e) Date: Jan. 27, 1995

[87] PCT Pub. No.: WO93/23345

PCT Pub. Date: Nov. 25, 1993

[30] Foreign Application Priority Data

May 8, 1992 [GB] United Kingdom .................. 9209967

[51] Int. Cl.⁶ .................................................. B32B 9/00
[52] U.S. Cl. ........................... 428/141; 428/98; 428/172; 428/446; 428/688; 428/697; 428/702; 264/28; 264/660
[58] Field of Search ..................................... 428/446, 688, 428/689, 697, 702, 98, 141, 172; 501/12, 17, 18, 32; 423/335, 338; 65/17.2; 264/28, 660

[56] References Cited

U.S. PATENT DOCUMENTS

| | | | |
|---|---|---|---|
| 3,676,366 | 7/1972 | Podschus | 252/448 |
| 3,885,005 | 5/1975 | Downing | 264/28 |
| 3,971,665 | 7/1976 | Suzuki | 106/58 |
| 4,015,040 | 3/1977 | Yoshida | 428/310 |
| 4,341,725 | 7/1982 | Weaver | 264/28 |
| 4,423,096 | 12/1983 | Jackson | 427/397.7 |
| 4,681,615 | 7/1987 | Toki | 65/18.1 |
| 5,047,181 | 9/1991 | Occhionero | 264/28 |
| 5,047,182 | 9/1991 | Sundback | 264/28 |
| 5,120,477 | 6/1992 | Suey | 264/28 |
| 5,597,512 | 1/1997 | Watanabe | 252/315.6 |

FOREIGN PATENT DOCUMENTS

| | | |
|---|---|---|
| 1311508 | 3/1973 | United Kingdom . |
| 1313498 | 4/1973 | United Kingdom . |

*Primary Examiner*—Timothy M. Speer
*Attorney, Agent, or Firm*—Kohn & Associates

[57] ABSTRACT

A method of producing a ceramic product comprising the steps of preparing an aqueous slurry of a silica sol with a refractile material comprising a calcium or zirconium silicate, causing the slurry to gel by physical or chemical means to form a solid structure, and drying said structure to form a porous ceramic product. The product has a high green strength which nevertheless increases on heating, and may be used in building applications.

15 Claims, 2 Drawing Sheets

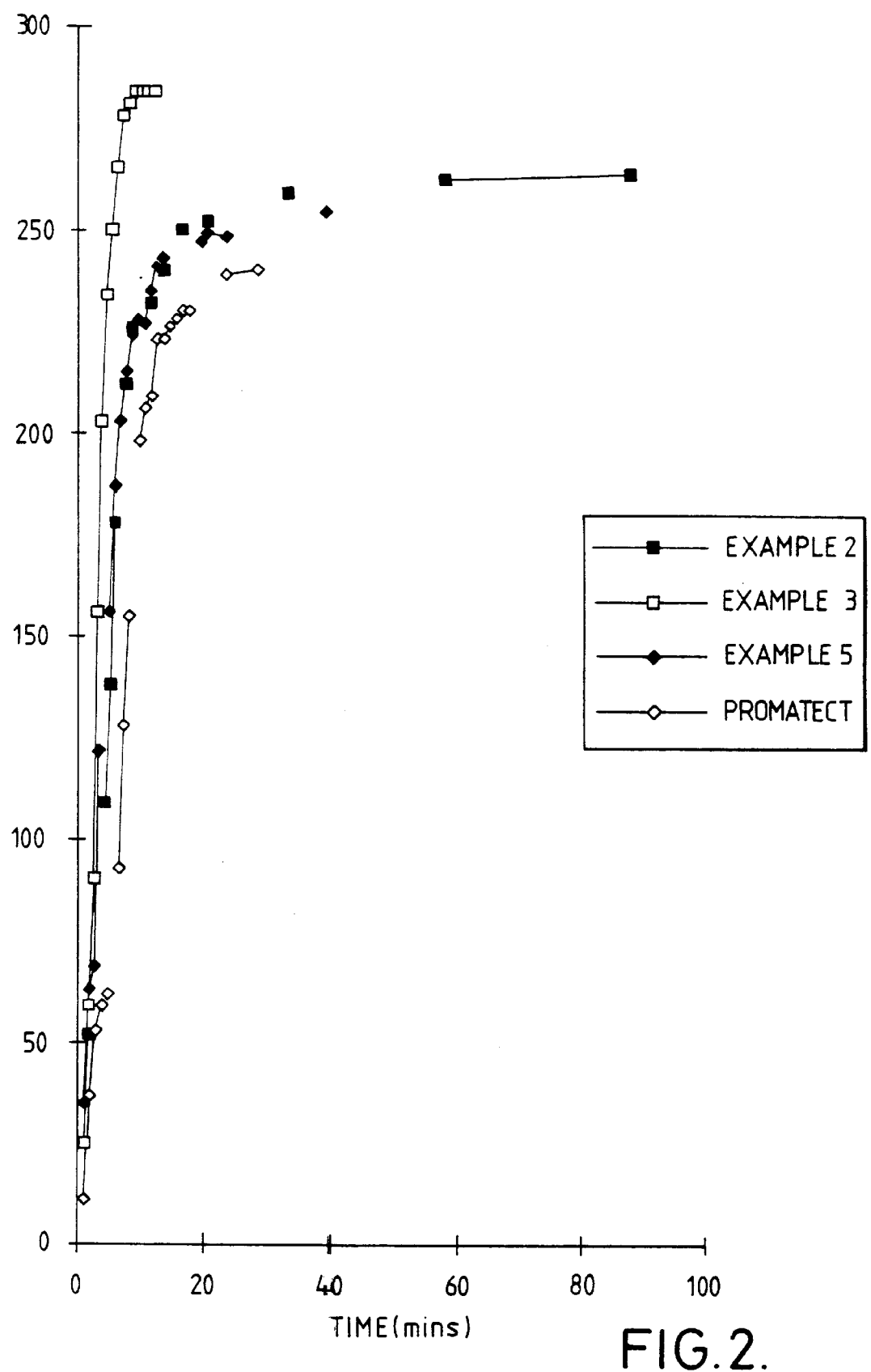
FIG.2. THERMAL RESISTANCE DATA

CERAMIC PRODUCTS

TECHNICAL FIELD

The present invention relates to ceramic products, and in particular it relates to ceramic products with high unfired, or "green", strength, especially for use in buildings.

BACKGROUND OF THE INVENTION

It is known to produce fire resistant products for use in buildings and many of these comprise inorganic material such as asbestos bound together into a board or duct. Asbestos is no longer recommended for many applications. These products may take the form of board for use in partitioning or in cladding steel structures. It is important that this material is itself non-flammable and must exhibit poor thermal conductivity so that the temperature of the flame is dropped across the thickness of the material to an acceptable level. This is particularly important when encasing steel structures since in some cases the steel can reach a temperature where it will soften and deform.

As ceramic products are fire resistant (although not necessarily having the low thermal conductivity of fireboard) they are useful as cladding products. However the green strength of most ceramic material limits the size and complexity of shape that can be made owing to handling problems before firing and/or glazing.

It is an object of the present invention to provide a ceramic material which can be formed into boards or other products which have good fire resistance, and to provide a method of making the same.

SUMMARY OF THE INVENTION

According to the first aspect of the present invention there is provided a method of producing a ceramic product comprising the steps of preparing an aqueous slurry of a silica sol with a refractile material comprising a calcium silicate and/or zirconium silicate, causing the slurry to gel by physical or chemical means to form a solid structure, and drying said structure to form a porous ceramic product.

The gelation may be induced by means of a chemical gelling agent, but it is currently preferred to use physical means such as pressure moulding and, in particular, freeze moulding to set the slurry.

Preferably the refractile material, which should be insoluble in water, is a calcium meta-silicate. Preferably, the material includes both calcium and zirconium silicates.

The product can be tailored, or explained more fully hereinafter, to produce a relatively lightweight fireboard or a high green strength ceramic board in large or complex shapes suitable for subsequent firing into a 'tile' (which term is to include moulded three-dimensional shapes as well as simple square or rectangular sheets).

When the resultant product is a ceramic board, it has been found to have unexpectedly high green (unfired) strength and, in addition, the surface of the product produced using this method is particularly suitable for application of ceramic glaze, due to its smoothness, porosity and the absence of materials in the composition which would damage the glaze when burned out during firing. Preferred products are large flat or cornered tiles primarily, but not exclusively, for use as internal or external decorative architectural wall cladding material.

We believe, although the utility of the invention does not depend on the variety of this belief, that the high green strength may be due to one or a combination of the following factors: a) the introduction of divalent, as opposed to trivalent (such as $Al_2O_3$), cationic refractile material; b) the change in pH caused by the addition of acid-neutral zirconium silicates into the alkaline sol; and c) the range of refractile particle sizes used, and the total specific surface area of these particles in relation to the silica particles, available for bonding. These may all or in part contribute to the formation of stronger bonds between the silica particles during the gelation process and confer the enhanced green strength properties of the product.

Where a fireboard is required, the product may be of relatively low density, advantageously no more than 850 $kg/m^3$, ideally 500 or even 250 $kg/m^2$.

The step of drying may be carried by firing the structure or by allowing the structure to dry under conditions substantially close to ambient.

The slurry is preferably frozen at a temperature in the range $-5°$ C. to $-150°$ C., advantageously in the region of $-40°$ C. to $-70°$ C.

The slurry comprises a colloidal sol of silica advantageously having an average particle size less than 30 nanometers.

The step of freezing said slurry may be carried out in a mould with an element of high thermal conductivity. In this case, the mould may be of a metal, or heat conductive material, such as aluminium, or a resin, such as an epoxy resin, filled with a metal powder, such as aluminium powder.

To produce a fireboard, the slurry may contain void forming material, such as particles of sawdust, polystyrene or the like, and which is burnt out during the step of firing, or a gas-forming agent. In addition, thermally resistant materials or strengthening fibres/materials comprising such as glass fibres, perlite, vermiculite, inorganic lumina, pulverise fuel ash, flake-like materials such as mica, or chopped fibres, e.g. mineral fibres, or such other materials as will give added strength to the structure, e.g. carbon fibres, may be present. The latter may be in the form of individual fibres, platelets or a mat thereof. As well as improving thermal resistance, the lower density makes the products lighter and easier to handle and install.

According to a second aspect of the present invention there is provided a ceramic product produced in accordance with the above described first aspect.

The product of the invention can be fired prior to use and will then assume the strength characteristics typical of ceramics in general. No loss of strength is observed, indeed strength is increased. This is significant in that calcium silicates are used in the production of fireboards and other products but, although the strength of these materials in the green state is relatively high, their strength is reduced or lost upon exposure to very high or sustained temperatures. It is a unique advantage of the products of the invention that they can be used in the green state, and their strength actually increases if subjected to heat, e.g. in the case of a fire. It is preferred to use zirconium silicate (e.g. Zirconsil) in fireboard products as this enhances strength in conditions of extreme heat for prolonged periods. Since no organic binder is employed there is none to burn out and weaken the product, and the ability to mould or cast means that more complex shapes than the simple flat boards of hitherto can be made.

The enhanced green strength means that much larger ceramic tiles/boards can be produced and improves pre-fired handleability to include sawing, routering, sanding and general cutting to required size or shape and ease of transportation. The fireboard products have enhanced green strength but the ceramic boards have even greater green strength and may be used unfired or partly fired in situations of heat exposure, where the heating will enhance the strength of the product prolonging its life, but will normally be fired and glazed. In this case the inclusion of void-forming products should be avoided as these will mar the glaze during firing. Very large glazed tiles can be produced which have many advantages over existing wall-cladding systems including the ability to produce cornered or three-dimensional shapes and to cast-in fixings.

Where firing and/or glazing is carried out the temperature should be sufficiently high to at least sinter the product and preferably cause crystallisation of the silica. Temperatures in the range of 700° to 1200° C., preferably of 1000° C. or more, may be employed.

Notwithstanding the product's exposure to heat in its untreated green state the ceramic board is weather resistant. Thus the increased green strength of the product, its stability on firing and ability to glaze, broadens the scope of product applications and will open up new markets to ceramic products.

The use of calcium or zirconium silicate refractile material fillers (most preferably acicular in nature) in combination with a colloidal silica sol such as SYTON X30 and gelation by either chemical or physical (pressure) means enables the production of large complex three-dimensional ceramic bodies with green (unfired) strength of at least 5 MPa and fired strengths in the range of 10 MPa to 30 MPa as determined by a modulus of rupture test.

A preferred refractile material is Wollastonite (calcium metasilicate), which is a mineral whose natural form is acicular (spiny), with length:diameter ratios from 3:1 to 20:1. The acicular nature of this material is believed to contribute to the green strength of the product.

It is preferred to employ at least 30% silica sol, especially where a calcium silicate is not used. Overall proportions of components may be within the following range:

| | |
|---|---|
| Silica sol | 30–75% |
| Silicates | 8–70% |
| Other ingredients | 8–40% |

Within this, the proportion of calcium metasilicate should preferably not exceed 65% (by weight) of the total slurry, and may conveniently be in the range 20–40%. More than one metasilicate may be used, e.g. Wollastonite G and Wollastonite 400, in which case each should be in the range 10–30%. If zirconium silicate, e.g. Zirconsil, is employed it should preferably be in the range 20–30%.

The ceramic product produced may have a density as high as 2,500 kg/m$^3$ but, for a fireboard, preferably has a density below 1500 kg/m$^3$, for example in the ranges around 250, 500 or 800 kg/m$^3$.

Two or more such products may be joined together at edges thereof by applying ceramic slip between them, refreezing the combination, and then drying them to form a unitary product.

According to a third aspect of the present invention there is provided a fire-resistant board, tile or casting comprising a ceramic product according to the second aspect above.

The casting may be provided with depressions of such depth as to accommodate ceramic glaze material.

The invention will now be more particularly described by way of example and with reference to the accompanying drawings, in which:

BRIEF DESCRIPTION OF THE FIGURES

FIG. 2 is a graph of thermal resistance data of products of the invention.

DETAILED DESCRIPTION OF THE INVENTION

Figure 1:
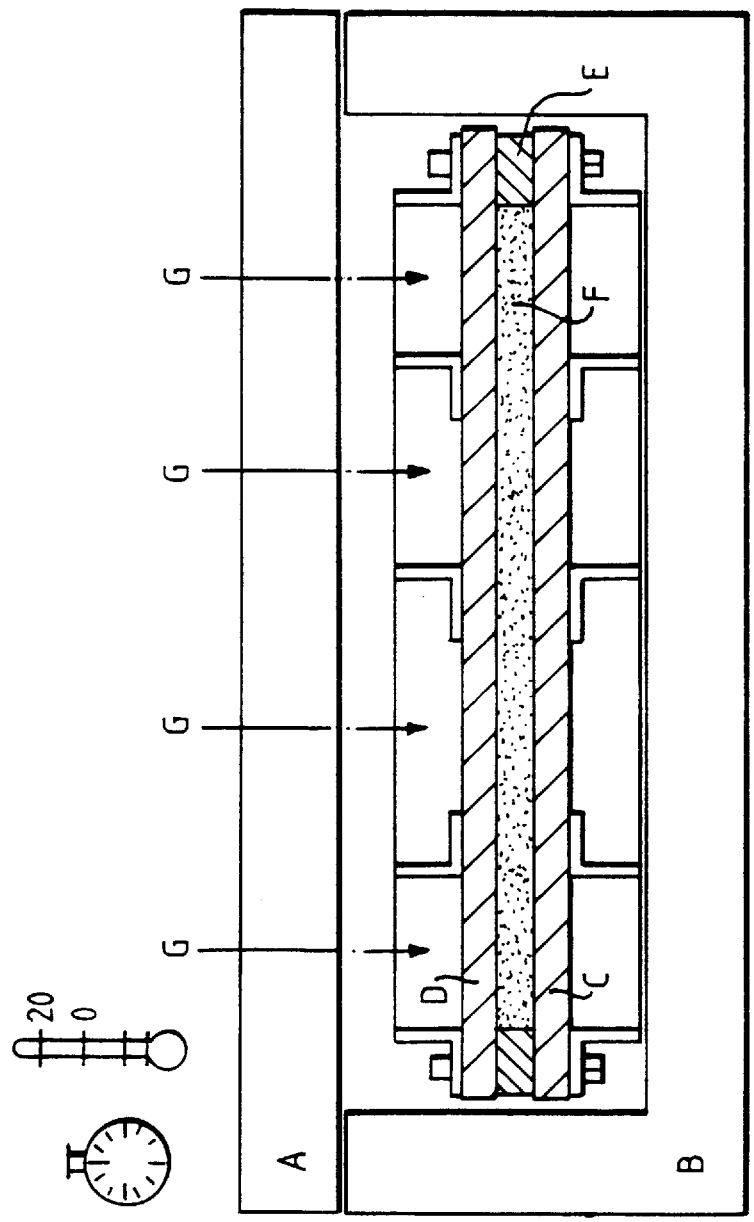
FIG. 1 is a diagram of a mould suitable for use in the method of the invention.

Referring to the drawing, FIG. 1 shows a mould comprising an insulated lid A and an insulated base B surrounding a lower C and upper D mould plate separated by spacers E. Slurry F in accordance with the invention is enclosed between plates C and D. Reservoirs G receive liquid nitrogen in order rapidly to freeze the slurry F.

One preferred step in the method of the present invention is that the ceramic slurry is frozen. The freezing temperature may typically be minus 70° C. Since the ceramic slurry contains a freeze-sensitive sol, the volume of the water component of the sol increases on its freezing to ice. This increased volume produces an internal pressure which densifies the ceramic particles of the slurry. Subsequently, when the material is warmed back up to room temperature, the ice melts and remains as water within the structure but the structure is now solid with good green strength.

The water is then dried off, to leave a ceramic material which is porous. The amount of porosity in the material is determined by the rate of freezing and the particle size and distribution of particles. The material may then be fired, if so desired.

One advantage of this freezing step is that there is virtually no dimensional change between the wet and dried products. Many ceramics produced by conventional routes such as pressing or slip casting shrink by up to twenty five percent of the original green state ceramic dimensions. Freeze coating eliminates this shrinkage to a very major degree. The material may also be moulded, possibly continuously to produce an elongate board.

As stated above, the material is porous and control of the pore size and distribution is affected by the particle size of the original slurry and by the rate of freezing. The preferred average particle size in the sol is less than 30 nanometers. The rate of freezing may be increased by providing moulds which have high thermal conductivity, such as those made of aluminium or an aluminium powder filled epoxy resin. The mould can either be immersed in a cryogenic tank or a cryogenic liquid, such as liquid nitrogen or solid carbon dioxide, from a freezing unit and can be pumped around channels within the mould. A mould release agent is generally used.

Use of the above procedures enables ceramics to be produced between 25% and 85% dense.

The use of particle sizes in the sol of less than 30 nanometers has a further advantage in that it enables the ceramic to be fired at relatively low temperatures because of the reactivity of the high surface area particles. If it is desired further to reduce the density of the material, e.g. to produce a fireboard, it is possible to add sacrificial materials as described hereinabove.

Fireboards produced in the above manner have extremely low thermal conductivity due to the high porosity but show excellent strength and integrity at temperatures up to 1200° C. They also have high thermal shock resistance, mechanical integrity and dimensional stability.

Because the freezing step gives a green state product which is itself strong or which can be fired without appreciable shrinkage, it is possible to produce very complex geometries, possibly three-dimensional, of insulation fireboard and ducting using the above method. Also, since the system is totally inorganic, and contains no organic binders, the material has better temperature stability since there are no binder systems that can burn out when the material is heated.

The ability to cast complex shapes may be used in the formation of decorative tiles. A series of progressively deeper depressions or profiles may be formed in a surface of the tile, which in use is intended to be outermost. Each depression or profile may be coated or filled with a glaze so that, when the tile or article is fired, the finish of the tile shows variation in colour depending on the depth and colour of the glazes used.

If it is desired to produce a larger product, tiles or other articles produced by the method may be joined by applying between them a bonding layer of ceramic slip, and refreezing the conjoined articles.

It is also possible to incorporate fittings of fixings, such as nuts or trunking, into the mould so that they become part of the cast article. This enables articles such as tunnel linings, cladding or ceramic glazed building panels to be produced for ease of use at a later date.

The invention is further illustrated in the following non-limiting Examples:

EXAMPLE 1

Composition (wt %):

73% Sodium stabilised silica sol

11% Precipitated silica

8% Zirconium silicate (Zirconsil)

8% Perlite (2JL)

36 ml of polystyrene spheres (3–5 mm) in 100 g of above slurry.

The precipitated silica is first mixed thoroughly into the colloidal silica until it is completely dispersed. Next, zirconsil powder is dispersed by continuous stirring until a uniform suspension is obtained. Finally, the perlite and polystyrene are spheres are added and mixed in.

The slurry is poured into a mould to produce the required shape, the mould sealed and then frozen with liquid nitrogen to −70° C. Upon warming back up to room temperature a solid structure has formed. When dry, the product is subjected to a low temperature 'firing' step at 800° C. for one hour which produces a porous ceramic having a density of 400 kg/cu.m. The temperature used in below that at which sintering takes place and does not contribute to the strength of the board. It is employed to burn out the heat labile ingredients in order to produce voids in the fireboard.

EXAMPLE 2

Composition (wt %):

71% Sodium stabilised colloidal silica sol

14% Zirconsil powder

7% Quartz sand

8% Perlite (2JL)

The Zirconsil powder is first dispersed in the sol and then the other ingredients mixed in.

A mat of inorganic fibres is introduced into the mould and the above slurry poured in. A second mat of inorganic fibre is then introduced on top of the slurry. A board was then freeze cast as described in Example 1, except that it was dried at 200° C. and fired at 850° C. for one hour. The board so obtained had a density of 560 kg/cu.m and appeared to have greater mechanical strength than that of Example 1.

The board was strong enough to be handled and was tested for thermal insulation by exposing one surface of the board to the face of an oven heated to 1000° C. and recording the temperature on the other surface over time. The results appear in FIG. 2. After the test the board retained its integrity and showed no visible dimensional change after exposure to 1000° C. for eight hours.

EXAMPLE 3

Composition (wt %):

56.3% Colloidal silica sol (sodium stabilised)

3.8% Precipitated silica 7.0% Quartz sand 36.3% Zirconsil powder ($ZrO_2.SiO_2$)

6.1% Perlite (2JL)

0.5% Chopped glass fibre

The precipitated silica was first dispersed in the colloidal silica sol followed by the other products.

The board was then freeze cast as described in Example 1 except that the board was dried at room temperature for several hours before further drying at 100° C. and firing at 800° C. for one hour. The board had a final density of 800 kg/cu.m. The thermal insulation test results are shown in FIG. 2.

EXAMPLE 4

Composition (wt %):

53.3% Syton X30 (silica sol)

13.3% Wollastonite (NYAD G)

13.3% Wollastonite (NYAD 400)

13.3% Zirconsil 6.6% Vermiculite (fine)

The designations NYAD G or 400 refer to the supplier's (Cooksons, Stoke on Trent) designation of the grade.

The Wollastonite C, followed by the Wollastonite 400, the zirconsil and finally the vermiculite were added to the sol in that order and mixed in. The board was freeze cast as described in Example 1 except that it was dried at room temperature and then at 100° C. overnight. No 'firing' was carried out. The board had a final density of 920 kg/cu.m and was thermally tested as in Example 3. Test results are shown in FIG. 2 and after 1 hour at 1000° C. no damage was visible to either surface of the board. The board was strength tested using a standard modulus of rupture test and the results are shown in Table 1 below together with comparative tests on proprietary fireboards Supalux and Promatect.

EXAMPLE 5

Composition (wt %):

| | |
|---|---|
| Silica Sol (SYTON X30) | 33.5% |
| Calcium Metasilicate (Wollastonite NYAD G) | 16.5% |
| Calcium Metasilicate (Wollastonite NYAD 400) | 25% |
| Zirconium Silicate (Zirconsil) | 25% |

The Syton X30 was weighed and placed in a mixing container. The other ingredients were individually stirred into the Syton in the following order: Wollastonite G, Wollastonite 400 and Zirconsil. An industrial whisk-type mixer was used to combine the ingredients.

Once combined the slurry is stable at room temperature for 24 hours, however some sedimentation does occur requiring the slurry to be restirred before use.

An aluminium mould was constructed such that the internal dimensions were 1200×1300×9 mm (see FIG. 1).

The slurry was poured into the mould to slight excess volume such that when the sixth side was bolted on, the excess slurry was separated out. This ensured that no air pockets were created.

The mould was then subject to cooling using liquid nitrogen which was poured into a bath containing the mould. The freezing process was allowed to continue for a minimum of 6 minutes and temperature maintained at −30°—−40° C. for a minimum further 6 minutes.

The ceramic board was removed from the mould and dried at a temperature of 150° C. for 2.5 hours. This produces a board with a high green strength (see Table 1).

Boards were either fired whole at 1190° C. or cut into smaller pieces and fired with or without glaze, and then strength tested on a universal testing machine (100 centres and 1.5 mm/min) and the MPa required to fracture the tile recorded, as above. The results are given in Table 1.

EXAMPLE 6

37.7% Syton X30 (silica sol)
18.6% Wollastonite NYAD G
43.7% Wollastonite NYAD 400

The wollastonite G and 400 were added to the sol in that order as described in Example 4. The slurry was poured into a mould and freeze cast as in example 5. Samples were tested in the green state and after firing both with and without glaze. The results are in Table 1.

TABLE 1

| SAMPLE | STRENGTH MPa |
| --- | --- |
| Supalux (Cape) | Av. 6.325 N = 4 |
| Promatec L (Eternit) | Av. 3.1 N = 4 |
| Example 4 | Av. 2.24 N = 4 |
| Example 5 (Green State) | Av. 8.5 N = 2 |
| Example 5 (Fired) | Av. 12.6 N = 3 |
| Example 5 (Glazed) | Av. 16.8 N = 3 |
| Example 6 (green state) | Av. 5.7 N = 2 |
| Example 6 (Fired) | Av. 11.33 N = 2 |
| Example 6 (Glazed) | Av. 11.5 N = 2 |

We claim:

1. A method of producing a ceramic product comprising the steps of preparing an aqueous slurry of silica sol with a refractory material comprising a calcium silicate in the substantial absence of trivalent cationic refractory material, freezing the closed mold to cause the slurry to gel to form a solid monolithic structure, and drying said structure to form a solid ceramic product.

2. A method as claimed in claim 1 wherein the refractory material is a calcium meta-silicate.

3. A method as claimed in claim 2 wherein a zirconium silicate is also present.

4. A method as claimed in claim 1 wherein the step of drying is carried out by firing the structure or by allowing the structure to dry under conditions substantially close to ambient.

5. A method as claimed in claim 1 wherein the slurry is frozen at a temperature in the range of −5° C. to −150° C.

6. A method as claimed in claim 1 wherein the slurry comprises a colloidal sol of silica having an average particle size less than 30 nanometers.

7. A method as claimed in claim 1 wherein the slurry contains void forming material selected from the group consisting of particles of sawdust and polystyrene and which is burnt out during the step of firing.

8. A method as claimed in claim 1 further including thermally insulating and strengthening the final product by adding to the glass substances selected from the group consisting of glass fibers, perlite, vermiculite, inorganic lamina, pulverised fuel ash, flake-like materials and carbon fibres.

9. A method as claimed in claim 1 wherein the refractory material is acicular.

10. A method as claimed in claim 1 in which the product in its green state has a strength at least 5 MPa and a fired strength in the range of 10 MPa to 30 MPa as determined by a modulus of rupture test.

11. A method as claimed in claim 1 wherein the proportion of calcium silicate should not exceed 65% (by weight) of the total slurry.

12. A method of producing a ceramic board comprising the steps of preparing an aqueous slurry of a silica sol with refractory material comprising calcium metasilicate, freezing the slurry in a closed mold to cause the slurry to gel to form a solid monolithic structure, drying the board and glazing or firing it to produce the finished product.

13. A ceramic product produced by a method as claimed in any of claims 1, or 12.

14. A fire-resistant board, tile or casting comprising a ceramic product according to claim 13.

15. A board as claimed in claim 14 having depressions or profiles of such depth as to accommodate a ceramic glaze material.

* * * * *